United States Patent
Zhang et al.

(10) Patent No.: US 12,530,842 B2
(45) Date of Patent: Jan. 20, 2026

(54) AIRBORNE LIDAR POINT CLOUD FILTERING METHOD DEVICE BASED ON SUPER-VOXEL GROUND SALIENCY

(71) Applicant: WUHAN UNIVERSITY, Hubei (CN)

(72) Inventors: Yongjun Zhang, Hubei (CN); Weiwei Fan, Hubei (CN); Xinyi Liu, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 155 days.

(21) Appl. No.: 18/583,705

(22) Filed: Feb. 21, 2024

(65) Prior Publication Data
US 2024/0355045 A1  Oct. 24, 2024

(30) Foreign Application Priority Data
Apr. 24, 2023 (CN) .......................... 202310462360.2

(51) Int. Cl.
  *G06T 17/00* (2006.01)
  *G01S 17/89* (2020.01)
  (Continued)

(52) U.S. Cl.
  CPC .............. *G06T 17/00* (2013.01); *G01S 17/89* (2013.01); *G06T 5/20* (2013.01); *G06T 7/11* (2017.01);
  (Continued)

(58) Field of Classification Search
  CPC .............. G06T 17/00; G06T 7/11; G06T 5/20; G06T 7/136; G06T 2207/10028;
  (Continued)

(56) References Cited

U.S. PATENT DOCUMENTS

| | | | | |
|---|---|---|---|---|
| 8,244,026 B2 * | 8/2012 | Nahari | ................ | G01C 15/002 |
| | | | | 382/285 |
| 2018/0081035 A1 * | 3/2018 | Guo | ...................... | G01S 7/4808 |

FOREIGN PATENT DOCUMENTS

| | | | | | |
|---|---|---|---|---|---|
| CN | 104574303 | A | * | 4/2015 | |
| CN | 113836484 | A | * | 12/2021 | ......... G01C 21/3804 |
| CN | 114820400 | A | * | 7/2022 | ............... G06T 5/20 |

OTHER PUBLICATIONS

Hu et al., "Semi-Global Filtering of Airborne LiDAR Data for Fast Extraction of Digital Terrain Models," Remote Sensing 7, No. 8, 2015. (Year: 2015).*

(Continued)

*Primary Examiner* — Kent W Chang
*Assistant Examiner* — Matthew Clothier
(74) *Attorney, Agent, or Firm* — JCIP GLOBAL INC.

(57) ABSTRACT

An airborne LiDAR point cloud filtering method based on super-voxel ground saliency is provided. The method begins by denoising the input LiDAR point cloud, employing a boundary-preserving TBBP super-voxel algorithm for super-voxel segmentation. The super-voxels are categorized into scanning bands in N directions based on their centroid coordinates. Subsequently, each direction's scanning bands are sorted, segmented, and their saliency values are computed. Utilizing saliency values as coordinating factors, an energy function for the optimal filtering plane is constructed and minimized, leading to the determination of the optimal segmentation plane. Ground and non-ground points are classified based on the segmentation plane, thereby establishing the point cloud filtering results. The use of super-voxel-based saliency calculation in this invention enables preliminary vertical filtering of target point clouds, addressing the challenge of misclassifying point clouds with concave structures as ground points.

8 Claims, 2 Drawing Sheets

(51) Int. Cl.
  *G06T 5/20* (2006.01)
  *G06T 7/11* (2017.01)
  *G06V 10/46* (2022.01)
  *G06V 10/764* (2022.01)

(52) U.S. Cl.
  CPC .......... *G06V 10/462* (2022.01); *G06V 10/764* (2022.01)

(58) Field of Classification Search
  CPC ......... G06T 2207/20024; G06T 3/4053; G06T 17/05; G06V 10/462; G06V 10/764; G06V 20/17; G01S 17/89; Y02A 90/10
  See application file for complete search history.

(56) References Cited

OTHER PUBLICATIONS

Zhou et al., "Multiscale Superpixels and Supervoxels Based on Hierarchical Edge-Weighted Centroidal Voronoi Tessellation," 2015 IEEE Winter Conference on Applications of Computer Vision, Waikoloa, HI, USA, 2015, pp. 1076-1083, 2015. (Year: 2015).*

Lin et al., "Toward better boundary preserved supervoxel segmentation for 3D point clouds," ISPRS Journal of Photogrammetry and Remote Sensing, vol. 143, pp. 39-47, 2018. (Year: 2018).*

Liu et al., "Terrain-adaptive Ground Filtering Of Airborne Lidar Data Based On Saliency-aware Thin Plate Spline," The International Archives of the Photogrammetry, Remote Sensing and Spatial Information Sciences, XLIII-B2-2020, 279-285, 2020. (Year: 2020).*

\* cited by examiner

AIRBORNE LIDAR POINT CLOUD FILTERING METHOD DEVICE BASED ON SUPER-VOXEL GROUND SALIENCY

CROSS-REFERENCE TO RELATED APPLICATION

This application claims the priority benefit of China application no. 202310462360.2, filed on Apr. 24, 2023. The entirety of the above-mentioned patent application is hereby incorporated by reference herein and made a part of this specification.

TECHNICAL FIELD

The present invention belongs to the field of surveying science and technology, involving an airborne LiDAR point cloud filtering method and device based on super-voxel ground saliency. It is primarily applied in areas such as digital elevation model (DEM) generation, point cloud classification, and three-dimensional model reconstruction.

DESCRIPTION OF RELATED ART

With the rapid development of unmanned aerial vehicles (airborne) and Light Detection and Ranging (LiDAR) technology, airborne LiDAR has been widely used for acquiring three-dimensional spatial information. LiDAR's penetration capability allows LiDAR point clouds to penetrate sparse vegetation and obtain high-precision elevation information of the Earth's surface, making it an efficient and accurate data source for reconstructing high-resolution three-dimensional models of the Earth's surface. The original LiDAR point cloud contains three-dimensional information about various objects in the target scene, such as the ground, vegetation, and buildings. Point cloud filtering aims to extract ground point clouds from massive point clouds, laying the foundation for generating high-precision digital elevation models and subsequent point cloud classification. Existing point cloud filtering methods can be roughly categorized into six types based on their principles: slope-based, morphology-based, clustering-based, surface fitting-based, irregular triangulation network-based, and machine learning-based methods. Each of these methods has its advantages and disadvantages, and the choice of algorithm and prior threshold values should be carefully considered to ensure the accuracy and speed of filtering results based on the characteristics of the target objects in the application scenario. For regions with significant differences in terrain features, there is currently a lack of a universally applicable method to meet the point cloud filtering requirements of various scenarios.

SUMMARY

The purpose of the present invention is to provide a LiDAR point cloud filtering method based on super-voxel ground saliency, aiming to address the issue of erroneous filtering in scenes with significant terrain feature variations, which is common in existing point cloud filtering methods based on regular grids. The invention first constructs super-voxels from the input point cloud and divides the point cloud into scanning strips and computes saliency based on super-voxels. It transforms the point cloud filtering problem into the segmentation problem of the optimal filtering plane within each super-voxel. By combining saliency parameters to construct an energy function and utilizing semi-global optimization, the invention solves for the optimal filtering plane, achieving the separation of ground and non-ground points. Compared to existing methods, this invention fully considers the distribution characteristics of point clouds in different scenes, aiming to improve the universality of filtering results while minimizing the input of filtering parameters.

To achieve the above objectives, a LiDAR point cloud filtering method based on super-voxel ground saliency includes the following steps:

Step 1: load point cloud data and preprocess it using a statistical filter to remove obvious outliers from the LiDAR point cloud.

Step 2: perform super-voxel segmentation on the preprocessed point cloud. The super-voxel resolution r is externally defined, generating super-voxel point cloud clusters that preserve the original local boundaries. Calculate the centroid coordinates for each super-voxel unit.

Step 3: based on the centroid coordinates of super-voxels, divide them into scanning strips in N directions.

Step 4: sort and segment each scanning strip in every direction, calculating the saliency values for each segment.

Step 5: use saliency values as coordinating factors to construct the energy function for the optimal filtering plane. Minimize this energy function to solve for the optimal segmentation plane. Classify ground and non-ground points based on the segmentation plane, determining the point cloud filtering results.

Furthermore, in step 2, employ a boundary-preserving TBBP super-voxel algorithm to achieve super-voxel segmentation.

Furthermore, set the value of N to be 16.

Furthermore, in step 3, the specific method for partitioning scanning strips is as follows:

Step 3.1: in the two-dimensional XOY plane, starting from the y-axis, rotate clockwise around the origin, with intervals of 22.5° for each scanning direction. Eventually, generate 16 equally spaced scanning directions in the two-dimensional plane.

Step 3.2: for each scanning direction, use the super-voxel resolution r as the translation unit. Generate multiple parallel lines passing through the target point cloud in the two-dimensional XOY plane. Divide super-voxels into multiple scanning strips based on the centroid coordinates.

Furthermore, in step 4, the specific method for segmenting strips and calculating saliency is as follows:

Step 4.1: within each scanning strip, sort super-voxel units from small to large based on the x-coordinate of the super-voxel's center. For strips parallel to the y-axis scanning direction, sort them based on the y-coordinate of the super-voxel's center. Set the elevation value for each super-voxel to the elevation of the lowest point within that super-voxel. Initialize the saliency value of each super-voxel to 1.

Step 4.2: calculate the absolute value of the elevation difference between two adjacent super-voxels in the sorting direction. If the absolute value is less than the segmentation elevation threshold $\Delta H$, include the super-voxel in the current segment. Otherwise, include it in the next segment. Complete the segmentation of all super-voxel units along the scanning line.

Step 4.3: after segmentation, calculate the elevation difference between the last super-voxel in the current segment and the first super-voxel unit in the adjacent next segment, according to the scanning order. If the elevation difference is greater than twice the segmentation elevation threshold ΔH, subtract 1/N from the saliency value of all super-voxel units in the current segment. Iterate the saliency calculation steps for segments where saliency has not changed in this scan.

Step 4.4: perform steps 4.2 and 4.3 separately for each of the N scanning directions. Obtain the saliency values for each super-voxel unit Si.

Furthermore, in step 4.2, the segmentation elevation threshold ΔH is externally defined and determined by the average error limit between the filtered ground points and the generated Digital Elevation Model (DEM).

Furthermore, in step 4.3, the iteration count is determined by the actual terrain. For regions with significant terrain variations, set the iteration count to 1, while for areas with gentle terrain, set it to 3.

Furthermore, in step 5, the specific method for constructing the energy function is as follows:

Step 5.1: calculate the minimum elevation value $H_{S_i}$ of the point cloud within each super-voxel unit $S_i$ as the elevation value for the current super-voxel. $H_{min}$ represents the minimum elevation value for the entire input point cloud. Discretize the super-voxel point cloud in the elevation direction:

$$N_z = \frac{H_{S_i} - H_{min}}{d} + m$$

$$L_{S_i} = \{l_i^n \mid l_i^n = H_{min} + n*d\}_{n=0}^{N_z}$$

In the above equation, $N_z$ is the maximum value that the filtering plane can take after discretizing the elevation for the current super-voxel, d is the unit height for elevation discretization, m is the elevation compensation coefficient, $l_i^n$ is the elevation value of the candidate filtering plane for super-voxel $S_i$, and n is any integer within the interval [0, $N_z$]. $L_{S_i}$ represents the set of elevation values $l_i^n$ for the candidate filtering plane of super-voxel $S_i$. The energy function expression for super-voxel $S_i$ on the t-th scanning strip is given by:

$$E_t(S_i) = E_{data}(S_i) + E_{smooth}(S_{i-1}, S_i)$$

Where the term $E_{data}$ utilizes the saliency value $\lambda_i$ calculated in Step 4 as coordinating factors. It is composed of the elevation difference between the elevation value $l_i^n \in L_{S_i}$ of the candidate segmentation plane and the elevation value $H_{S_i}$ of the current super-voxel, along with a penalty term for the optimal elevation plane passing through the super-voxel. It is expressed as:

$$E_{data}(S_i) = \begin{cases} \lambda_i * (1.0 - e^{-(H_{S_i} - l_i^n)^2}) + (1 - \lambda_i)(l_i^n - H_{S_i}), & l_i^n - H_{S_i} \geq 0 \\ \lambda_i * (1.0 - e^{-(H_{S_i} - l_i^n)^2}), & l_i^n - H_{S_i} < 0 \end{cases}$$

The smoothing term $E_{smooth}$ is composed of the absolute value of the elevation difference between the optimal filtering plane of the current super-voxel $S_i$ and the adjacent super-voxel $S_{i-1}$ along the scanning direction. It is expressed as:

$$E_{smooth}(S_{i-1}, S_i) = |l_{i-1}^n - l_i^n|$$

Step 5.2: accumulate the energy functions for each super-voxel unit in the N directions and minimize the cumulative function to solve for the optimal filtering plane. Based on the semi-global optimization approach, the solution for the filtering plane approximates the globally optimal filtering plane, namely:

$$l_i = \mathrm{argmin}\left(\sum_{t=1}^{N} E_t(S_i)\right)$$

Step 5.3: based on the optimal filtering plane, perform point-wise evaluation on the super-voxel point cloud using the following criteria: if the elevation value of a point is less than the filtering plane's elevation value for its corresponding super-voxel, or the absolute difference between the point's elevation value and the filtering plane's elevation value for its corresponding super-voxel is less than the discretization unit d, then the point is classified as a ground point. Otherwise, the point is classified as a non-ground point.

Additionally, set the size d to 0.2 times the segmentation elevation threshold ΔH, and the parameter m is assigned a value of 5.

The invention further provides a LiDAR point cloud filtering device based on super-voxel ground saliency, comprising the following modules:

Preprocessing module: responsible for loading point cloud data and performing preprocessing, utilizing statistical filters to remove conspicuous outliers in the LiDAR point cloud.

Super-voxel segmentation module: used to perform super-voxel segmentation on the preprocessed point cloud. The super-voxel resolution r is externally defined, generating super-voxel point cloud clusters that preserve the original local boundaries. It also calculates the centroid coordinates for each super-voxel unit.

Scanning strip partitioning module: responsible for partitioning the super-voxels into scanning strips in N directions based on their centroid coordinates.

Saliency computation module: used to sort and segment each scanning strip in every direction and compute the saliency values for each segment.

Filtering module: responsible for utilizing saliency values as coordinating factors to construct the energy function for the optimal filtering plane. It minimizes this energy function to solve for the optimal segmentation plane. Based on the segmentation plane, it classifies ground and non-ground points, determining the point cloud filtering results.

Compared to existing technologies, the present invention offers the following advantages and beneficial effects:

Clustered Super-Voxel Units: the invention employs a segmentation approach to cluster the original point cloud into point cloud clusters based on super-voxels. In contrast to many current point cloud filtering methods relying on regular grids, the use of super-voxel units helps preserve the original object boundaries. This approach is well-suited for complex environments like steep slopes and wooded areas. The saliency calculation at the super-voxel level enhances the initial filtering of target point clouds in the vertical direction, providing improved differentiation between ground and non-ground points.

Terrain-Adaptive Iterative Filtering: the invention introduces a multi-iteration filtering mechanism during the saliency calculation stage, specifically tailored to the varying terrain characteristics of urban mountainous regions. This mechanism effectively prevents the phenomenon where concave structures on the top of buildings might be erroneously classified as ground points, thereby enhancing the robustness of the filtering method.

DESCRIPTION OF THE EMBODIMENTS

In order to provide a clearer understanding of the objectives, technical solutions, and advantages of the present invention, detailed explanations are presented below in conjunction with accompanying drawings and embodiments. It should be understood that the specific embodiments described here are only intended to explain the invention and not to limit its scope.

To address the challenge of erroneous filtering in scenes with significant terrain feature variations, the technical solution of the present invention will be specifically elucidated with reference to the accompanying drawings and embodiments.

Figure 1:
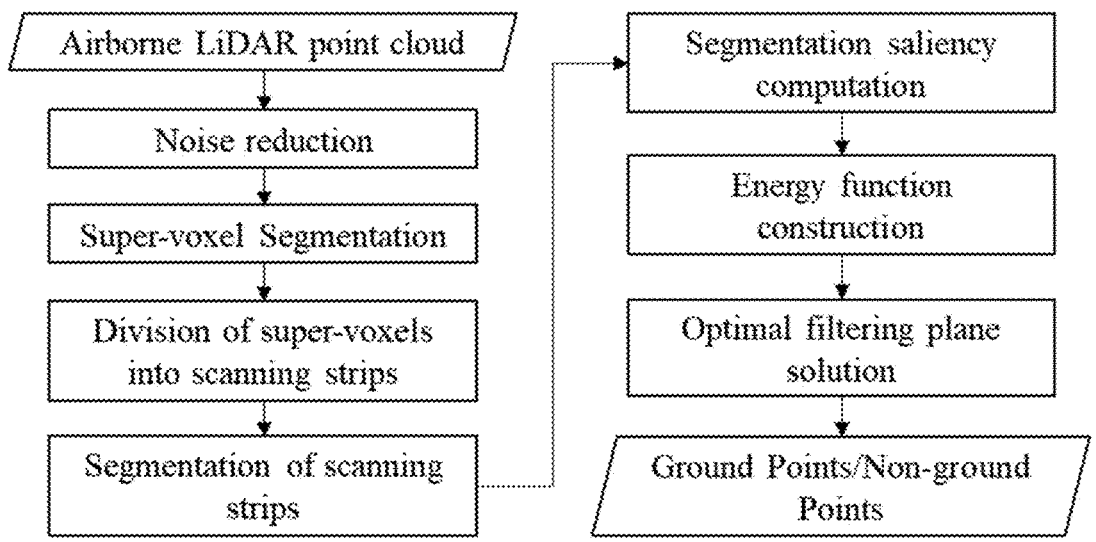
FIG. 1 is a flowchart of an embodiment of the present invention.

As shown in FIG. 1, the embodiment of the present invention provides a method for airborne LiDAR point cloud filtering based on super-voxel ground saliency, comprising the following steps:

Step 1: load point cloud data and preprocess it using a statistical filter to remove obvious outliers from the LiDAR point cloud.

Figure 2:
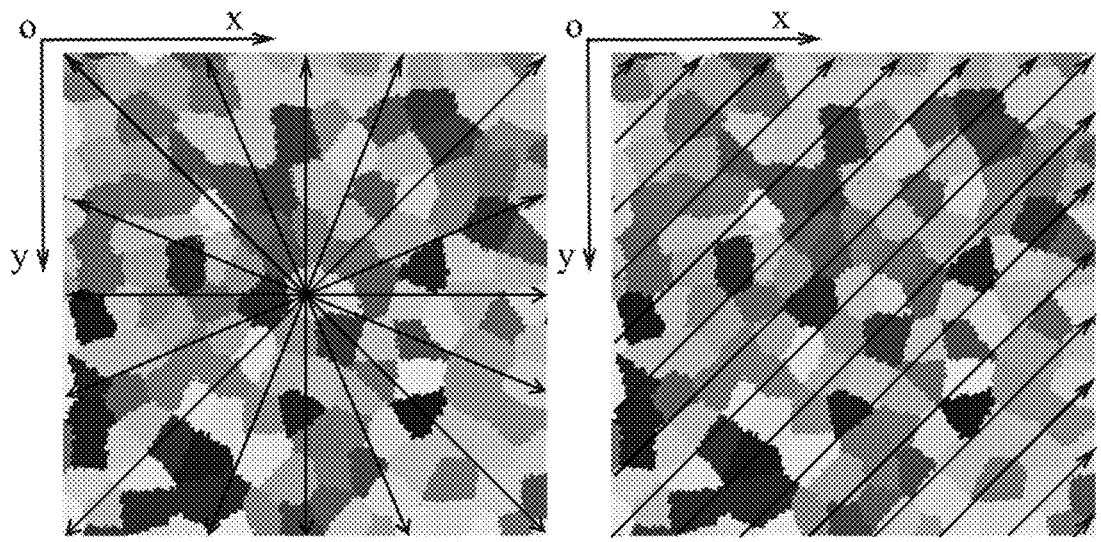
FIG. 2 shows scanning strip division diagrams of super-voxels in all scanning directions and in a single direction.

Step 2: perform super-voxel segmentation on the preprocessed point cloud. The super-voxel resolution r is externally defined, generating super-voxel point cloud clusters that preserve the original local boundaries. Calculate the centroid coordinates for each super-voxel unit Step 3: divide super-voxels into N directional scan bands based on the centroid coordinates of the super-voxels. The direction division of scan bands is illustrated in FIG. 2, and the specific method is as follows:

Step 3.1: in the 2D XOY plane, starting from the y-axis, rotate clockwise around the origin, with intervals of 22.5° for each scanning direction. Eventually, N evenly distributed scanning directions are generated in the 2D plane.

Step 3.2: for each scanning direction, using the super-voxel resolution r as the translation unit, multiple parallel lines are generated in the 2D XOY plane that intersect the target point cloud. Super-voxels are segmented into multiple scan bands based on the centroid coordinates.

Figure 3:
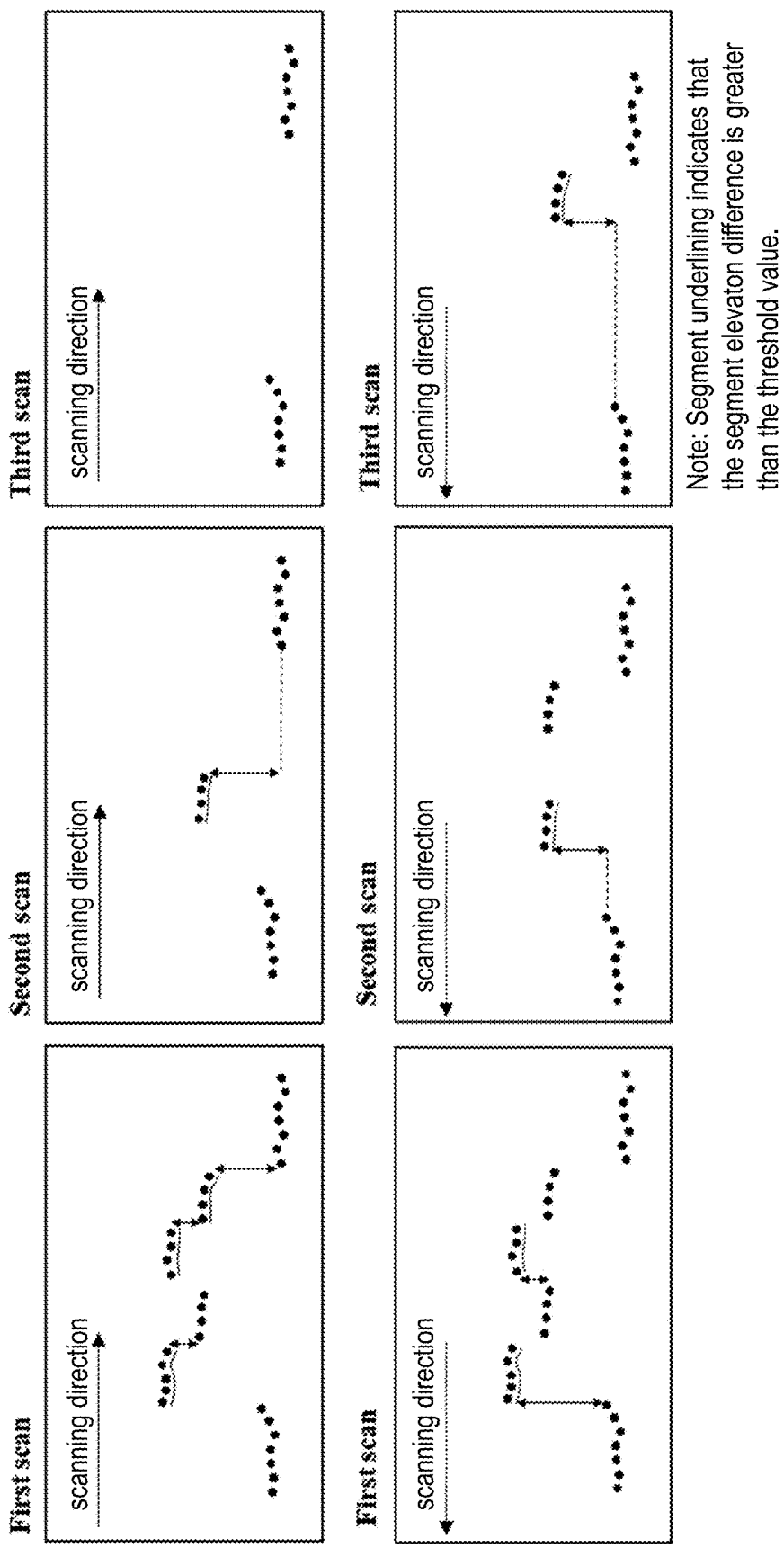
FIG. 3 shows diagrams of segmented ground saliency calculation in the elevation direction.

Step 4: sort and segment each scan band in every direction, and calculate the saliency values. The iterative illustration of saliency calculation during scanning is shown in FIG. 3. The specific method is as follows:

Step 4.1: within each scan band, super-voxel units are sorted from smallest to largest based on their x-coordinates. Specifically, for bands parallel to the y-axis scan direction, sorting is based on the y-coordinates of the super-voxel centroids. The elevation value of each super-voxel is set to the elevation of the lowest point within that super-voxel. The initial saliency value $\lambda_i$ of super-voxel $S_i$ is uniformly set to 1.

Step 4.2: calculate the absolute value of the elevation difference between two adjacent super-voxels along the sorting direction. If the absolute value is less than the segmentation elevation threshold $\Delta H$, the super-voxel is assigned to the current segment; otherwise, it is assigned to the next segment. This segmentation elevation threshold $\Delta H$ is externally input and can be determined by the average error limit between filtered ground points and the generated DEM.

Step 4.3: after segmentation, calculate the elevation difference between the last super-voxel in the current segment and the first super-voxel unit in the adjacent next segment, following the scanning order. If the elevation difference is greater than twice the segmentation elevation threshold $\Delta H$, reduce the saliency values $\lambda_i$ of all super-voxel units in that segment by 1/N. Iteratively perform the saliency calculation steps for segments where saliency has not changed in this scan. The number of iterations is determined by the actual terrain; it is set to 1 for areas with significant terrain undulation and 3 for flat terrain.

Step 4.4: perform Steps 4.2 and 4.3 for each of the N scanning directions, obtaining the saliency values $\lambda_i$ for each super-voxel unit $S_i$.

Step 5: utilizing saliency values as coordinating factors, construct an energy function to formulate the optimal filtering plane. Solve for the optimal segmentation plane to complete point cloud filtering. The detailed steps are as follows:

Step 5.1: compute the elevation minimum $H_{S_i}$ for each super-voxel unit $S_i$, derived from the elevation values of the point cloud within that unit. $H_{min}$ corresponds to the minimum elevation value across the entire input point cloud. Discretize the super-voxel point cloud along the elevation direction:

$$N_z = \frac{H_{S_i} - H_{min}}{d} + m$$

$$L_{S_i} = \{l_i^n \mid l_i^n = H_{min} + n * d\}_{n=0}^{N_z}$$

In the above equation, $N_z$ represents the maximum value of the interval that the filtering plane can take after the elevation discretization of the current super-voxel. d is the unit height for elevation discretization, set to 0.2 times the segmentation elevation threshold $\Delta H$. m is the elevation compensation coefficient, typically set to 5. $l_i^n$ denotes the elevation value of the candidate filtering plane for super-voxel $S_i$, where n is any integer within the interval $[0, N_z]$. $L_{S_i}$ represents the set of elevation values $l_i^n$ for the candidate filtering planes of super-voxel $S_i$. The energy function expression for super-voxel $S_i$ on the t-th scanning strip is given by:

$$E_t(S_i) = E_{data}(S_i) + E_{smooth}(S_{i-1}, S_i)$$

In this expression, the data term $E_{data}$ incorporates the significance value $\lambda_i$ calculated in step 4.4 as a coordinating factor. It is composed of the elevation difference between the candidate filtering plane's elevation value $l_i^n \in L_{S_i}$ and the current elevation value $H_{S_i}$ of the super-voxel $S_i$, along with a penalty term for the optimal elevation plane passing through the super-voxel. It is expressed as:

$$E_{data}(S_i) = \begin{cases} \lambda_i * \left(1.0 - e^{-(H_{S_i} - l_i^n)^2}\right) + (1 - \lambda_i)(l_i^n - H_{S_i}), & l_i^n - H_{S_i} \geq 0 \\ \lambda_i * \left(1.0 - e^{-(H_{S_i} - l_i^n)^2}\right), & l_i^n - H_{S_i} < 0 \end{cases}$$

The smoothing term $E_{smooth}$ is determined by the absolute difference in optimal filtering plane elevation between the current super-voxel $S_i$ and its adjacent super-voxel $S_{i-1}$ along the scanning direction, expressed as:

$$E_{smooth}(S_{i-1}, S_i) = |l_{i-1}^n - l_i^n|$$

Step 5.2 involves the summation and minimization of the energy functions across N directions for each super-voxel unit. The solution for the optimal filtering plane is obtained by leveraging a semi-global optimization approach, approximating the result to the globally optimal filtering plane. The expression for this is given by:

$$l_i = \mathrm{argmin}\left(\sum_{t=1}^{N} E_t(S_i)\right)$$

In Step 5.3, based on the optimal filtering plane, a point-wise evaluation is performed on the super-voxel point cloud using the following criteria: if the elevation value of a point is less than the filtering plane's elevation within the respective super-voxel, or if the absolute difference between the point's elevation and the filtering plane's elevation within the super-voxel is less than the discretization unit d, then the point is classified as a ground point; otherwise, it is categorized as a non-ground point.

The present invention further provides an airborne LiDAR point cloud filtering device based on super-voxel ground saliency, comprising the following modules:

Preprocessing module: responsible for loading point cloud data and performing preprocessing, utilizing statistical filters to remove conspicuous outliers in the LiDAR point cloud.

Super-voxel segmentation module: used to perform super-voxel segmentation on the preprocessed point cloud. The super-voxel resolution r is externally defined, generating super-voxel point cloud clusters that preserve the original local boundaries. It also calculates the centroid coordinates for each super-voxel unit.

Scanning strip partitioning module: responsible for partitioning the super-voxels into scanning strips in N directions based on their centroid coordinates.

Saliency computation module: used to sort and segment each scanning strip in every direction and compute the saliency values for each segment.

Filtering module: responsible for utilizing saliency values as coordinating factors to construct the energy function for the optimal filtering plane. It minimizes this energy function to solve for the optimal segmentation plane. Based on the segmentation plane, it classifies ground and non-ground points, determining the point cloud filtering results.

The specific implementation methods of each module are consistent with the respective steps, and details are not provided in this description. It should be understood that ordinary skilled artisans in this field can make improvements or modifications based on the above description, and all such improvements and modifications should fall within the scope of the claims attached to the present invention.

What is claimed is:

1. An airborne LiDAR point cloud filtering method based on super-voxel ground saliency, comprising the following steps:
   step 1: loading point cloud data and performing preprocessing, and utilizing statistical filters to eliminate conspicuous outliers in the LiDAR point cloud;
   step 2: performing super-voxel segmentation on the preprocessed point cloud, wherein a super-voxel resolution r is externally defined; generating super-voxel point cloud clusters which preserves original local boundaries, and computing centroid coordinates for each of super-voxel units;
   step 3: partitioning a plurality of super-voxels into scanning strips in N directions based on their centroid coordinates;
   step 4: arranging and segmenting the scanning strips in each direction, and calculating saliency values for each segment; and
   step 5: using the saliency values as coordinating factors to construct an energy function for an optimal filtering plane; minimizing the energy function to solve for an optimal segmentation plane; classifying ground and non-ground points based on the optimal segmentation plane, and determining point cloud filtering results,
   wherein constructing the energy function in step 5 comprises:
   step 5.1: calculating a minimum elevation value $H_{S_i}$ of a point cloud within each super-voxel unit $S_i$ as an elevation value for a current super-voxel, and discretizing a super-voxel point cloud in an elevation direction as follows:

$$N_z = \frac{H_{S_i} - H_{min}}{d} + m,$$

$$L_{S_i} = \{l_i^n \mid l_i^n = H_{min} + n*d\}_{n=0}^{N_z},$$

wherein in the above equation, $H_{min}$ represents a minimum elevation value for an entire input point cloud, $N_z$ is a maximum value that a filtering plane takes after an elevation discretization for the current super-voxel, d is a unit height for the elevation discretization, m is an elevation compensation coefficient, $l_i^n$ is an elevation value of a candidate filtering plane for a super-voxel $S_i$, and n is any integer within the interval $[0, N_z]$, $L_{S_i}$ represents a set of elevation values $l_i^n$ for the candidate filtering plane of the super-voxel $S_i$ wherein the energy function for the super-voxel $S_i$ on the t-th scanning strip is expressed as:

$$E_t(S_i) = E_{data}(S_i) + E_{smooth}(S_{i-1}, S_i),$$

wherein the term $E_{data}$ utilizes the saliency values $\lambda_i$ calculated in step 4 as coordinating factors, and $E_{data}$ is composed of an elevation difference between the elevation value $l_i^n \in L_{S_i}$ of a candidate segmentation plane and the elevation value $H_{S_i}$ of the current super-voxel, along with a penalty term for an optimal elevation plane passing through the super-voxel wherein $E_{data}$ is expressed as:

$$E_{data}(S_i) = \begin{cases} \lambda_i * \left(1.0 - e^{-(H_{S_i} - l_i^n)^2}\right) + (1 - \lambda_i)(l_i^n - H_{S_i}), & l_i^n - H_{S_i} \geq 0 \\ \lambda_i * \left(1.0 - e^{-(H_{S_i} - l_i^n)^2}\right), & l_i^n - H_{S_i} < 0 \end{cases},$$

wherein the smoothing term $E_{smooth}$ is composed of an absolute value of the elevation difference between the optimal filtering plane of the current super-voxel $S_i$ and the adjacent super-voxel $S_{i-1}$ along the scanning direction, where $E_{smooth}$ is expressed as:

$$E_{smooth}(S_{i-1}, S_i) = |l_{i-1}^n - l_i^n|;$$

step 5.2: accumulating energy functions for each of the super-voxel units in the N directions and minimizing a cumulative function to solve for the optimal filtering plane, wherein based on a semi-global optimization approach, a solution for the filtering plane approximates the optimal filtering plane, namely:

$$l_i = \mathrm{argmin}\left(\sum_{t=1}^{N} E_t(S_i)\right);$$

step 5.3: based on the optimal filtering plane, performing point-wise evaluation on the super-voxel point cloud using the following criteria:
if the elevation value of a point is less than the filtering plane's elevation value for its corresponding super-voxel, or the absolute difference between the point's elevation value and the filtering plane's elevation value for its corresponding super-voxel is less than the unit height d, then the point is classified as a ground point; otherwise, the point is classified as a non-ground point.

2. The airborne LiDAR point cloud filtering method based on the super-voxel ground saliency according to claim 1, wherein a boundary-preserving TBBP super-voxel algorithm is utilized in step 2 for super-voxel segmentation.

3. The airborne LiDAR point cloud filtering method based on the super-voxel ground saliency according to claim 1, wherein a value of N is set to 16.

4. The airborne LiDAR point cloud filtering method based on super-voxel ground saliency according to claim 1, wherein partitioning the plurality of super-voxels into the scanning strips in step 3 comprises:
step 3.1: in a two-dimensional XOY plane, starting from y-axis, rotating clockwise around an origin at intervals of 22.5 degrees, and generating 16 evenly spaced scanning directions in the two-dimensional XOY plane; and
step 3.2: for each scanning direction, using the super-voxel resolution r as a translation unit, creating multiple parallel lines crossing a target point cloud in the two-dimensional XOY plane, partitioning the super-voxels into multiple scanning strips based on the centroid coordinates of the plurality of super-voxels.

5. The airborne LiDAR point cloud filtering method based on the super-voxel ground saliency according to claim 1, wherein segmenting the scanning strips and calculating the saliency values in step 4 comprises:
step 4.1: within each scanning strip, sorting the super-voxel units in ascending order based on x-coordinates of their centroids; for strips parallel to y-axis scanning direction, additionally sorting them in ascending order based on y-coordinates of their centroids; setting an elevation value of each of the super-voxels to an elevation value of the lowest point within that super-voxel; initializing the saliency value of each of the super-voxels to 1;
step 4.2: calculating an absolute difference in elevation between adjacent super-voxels in a sorting direction; if the absolute difference is less than a segmentation elevation threshold $\Delta H$, including a super-voxel of the adjacent super-voxels into a current segment; otherwise, including the super-voxel of the adjacent super-voxels into a next segment; and completing segmentations of all super-voxel units along a scanning line;
step 4.3: after the segmentations, calculating an elevation difference between the last super-voxel in the current segment and the first super-voxel in the adjacent next segment, following a scan order; if the elevation difference exceeds twice the segmentation elevation threshold $\Delta H$, reducing the saliency values of all super-voxel units in the current segment by 1/N; and iterating saliency computation steps for unchanged segments in this scan; and
step 4.4: performing step 4.2 and step 4.3 for each of the N directions, respectively; obtaining the saliency values for each super-voxel unit $S_i$.

6. The airborne LiDAR point cloud filtering method based on the super-voxel ground saliency according to claim 5, wherein the segmentation elevation threshold $\Delta H$ in step 4.2 is externally defined, and is determined by an average error limit between filtered ground points and a digital elevation model.

7. The airborne LiDAR point cloud filtering method based on the super-voxel ground saliency according to claim 5, wherein the number of iterations in step 4.3 is determined by an actual terrain, wherein the number of iterations is set to 1 for regions with a significant terrain variation, and the number of iterations is set to 3 for regions with a gentle terrain.

8. The airborne LiDAR point cloud filtering method based on the super-voxel ground saliency according to claim 5, wherein the unit height d is set to 0.2 times the segmentation elevation threshold $\Delta H$, and a value of the elevation compensation coefficient m is set to 5.

* * * * *